Figure 1:
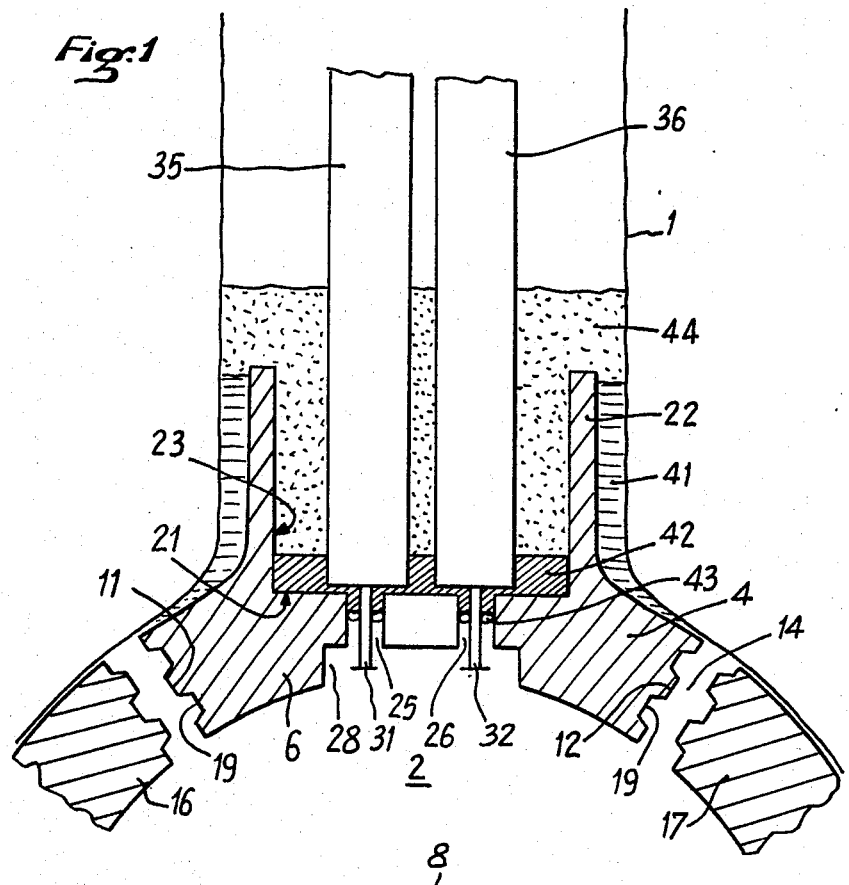

United States Patent [19]
Boulanger et al.

[11] Patent Number: 4,580,924
[45] Date of Patent: Apr. 8, 1986

[54] PROCESS AND DEVICE FOR BLOCKING A WELL OPENING OUT IN THE CEILING OF AN UNDERGROUND CAVITY FOR LOW TEMPERATURE STORAGE

[75] Inventors: Alain Boulanger, Paris, France; Walter G. M. M. Luyten, Schoten, Belgium

[73] Assignees: Societe Francaise de Stockage Geostock, France; Distrigaz, Belgium

[21] Appl. No.: 698,756

[22] Filed: Feb. 7, 1985

Related U.S. Application Data

[63] Continuation of Ser. No. 461,709, Jan. 28, 1983, abandoned.

[30] Foreign Application Priority Data

Jan. 29, 1982 [FR] France .................. 82 01447

[51] Int. Cl.4 .............................. B65G 5/00
[52] U.S. Cl. ........................... 405/56; 405/53
[58] Field of Search ..................... 405/53–59, 405/128; 52/20, 21, 224; 220/3, 5 A; 62/45

[56] References Cited

U.S. PATENT DOCUMENTS

| 1,206,484 | 11/1916 | Swan | 52/224 |
| 2,855,757 | 10/1958 | Meade | 405/53 |
| 2,928,249 | 3/1960 | Miles | 405/53 |
| 3,106,824 | 10/1963 | Gregory | 405/53 X |
| 3,151,416 | 10/1964 | Eakin et al. | 405/55 X |
| 3,159,006 | 12/1964 | Sliepcevich | 405/55 X |
| 3,256,069 | 6/1966 | Peterson | 220/3 X |
| 3,352,116 | 11/1967 | Waterman | 405/53 |
| 3,526,095 | 9/1970 | Peck | 405/57 |
| 3,581,513 | 6/1971 | Cranmer et al. | 405/56 X |
| 3,714,909 | 2/1973 | Anderson et al. | 405/56 X |
| 3,734,827 | 5/1973 | Schilling | 220/3 X |
| 3,990,941 | 11/1976 | Scholz | 52/224 X |

FOREIGN PATENT DOCUMENTS

| 1806357 | 8/1970 | Fed. Rep. of Germany | 52/21 |
| 2747268 | 4/1979 | Fed. Rep. of Germany | 220/3 |
| 2266769 | 10/1975 | France | 405/55 |
| 2372753 | 8/1978 | France | 405/55 |
| 721193 | 1/1955 | United Kingdom . | |
| 963038 | 7/1964 | United Kingdom | 405/55 |

Primary Examiner—Dennis L. Taylor
Assistant Examiner—Nancy J. Stodola
Attorney, Agent, or Firm—Sughrue, Mion, Zinn, Macpeak, and Seas

[57] ABSTRACT

To block the mouth of a well (1) opening out in the ceiling of an underground cavity (2), a part (4) in the shape of a keystone is used, which has a hole through the middle for the passage of pipes (31, 32), suitable cements are then poured in to make the whole system integral, and the well is filled.

5 Claims, 2 Drawing Figures

PROCESS AND DEVICE FOR BLOCKING A WELL OPENING OUT IN THE CEILING OF AN UNDERGROUND CAVITY FOR LOW TEMPERATURE STORAGE

This is a continuation of application Ser. No. 461,709, filed Jan. 28, 1983, abandoned.

The present invention relates to underground installations for the low-temperature storage of products, in particular liquefied fuel gases stored at atmospheric pressure. The invention relates to a process and a device for blocking a well opening out in the ceiling of an underground cavity for low-temperature storage. The term "low temperature" is understood as meaning a temperature below the freezing point of the underground water impregnating the terrain (the rocks), so that, when the reservoir is in use, the cavity walls are impregnated and/or covered with ice, which makes the cavity leaktight. The use temperatures can be between $-10°$ and $-196°$ C.

A process for constructing an underground gallery for low-temperature (cryogenic) storage is already known from French Pat. No. 2,372,752 of Dec. 2, 1976. In this process, the cavity walls and the surrounding rock are observed during the cooling periods, which run from the time at which the cavity walls are rendered watertight by the freezing of the water to the time at which the cooling ends, so as to intervene during this period, if necessary, according to these observations, by modifying the initial cooling program and/or by rectifying the irregularities which have appeared.

To dig the cavity, it is sometimes necessary to construct a service well to enable the personnel and equipment to pass through and the debris to be discharged. Once the cavity is finished, the well can be filled after the pipes which make it possible to run the reservoir have been arranged therein. This filling is necessary for reasons of thermal and mechanical equilibrium of the ground, which freezes around the cavity because of the low temperature prevailing therein (boiling point of the gas stored at atmospheric pressure).

The cavity must be blocked before the well is filled. This is a difficult operation because the materials introduced at ambient temperature are then cooled to low temperature in order to bring the reservoir into use. French Pat. No. 2,372,753 of Dec. 2, 1976 describes a blocking device for low-temperature underground storage. In this device, constructed near the bottom of the well used for digging the underground cavity, which comprises a surface for bearing against the surrounding rock, passages for the pipes, and sealing means, the surface for bearing against the rock is in the shape of a truncated cone which is open at the top and has a vertex angle of between 60° and 140°, and the sealing means are arranged above and independently of the bearing surface. After this device has been introduced, the well is filled with concrete. A seal of this kind must be made at a certain height above this cavity so as to have a sufficiently solid seat for the seal. However, in order to have a good arrangement of the isotherms around the cavity, it is preferable to have the seal as close as possible to the cavity, advantageously at the level of its wall. The present invention relates to a blocking device intended for sealing the cavity in alignment with its wall, and also relates to a process for introducing this blocking device.

The invention applies more particularly, but not exclusively, to the case where the cavity wall is supported, before the cooling operation, by temporary props such as, for example, concrete.

According to the present invention, a device for blocking the mouth of a well opening out in the ceiling of an underground cavity for low-temperature storage is characterised in that it comprises a part in the shape of a keystone, with at least two generally plane faces inclined to the vertical so as to meet at the bottom, this part possessing at least one orifice, in the region of its vertex, for the passage of pipes.

Other characteristics of the invention will become apparent in the course of the description which now follows, which is given by way of a non-limiting example, with reference to the attached drawings, and which will provide a clear understanding of how the invention can be put into effect.

Figure 2:
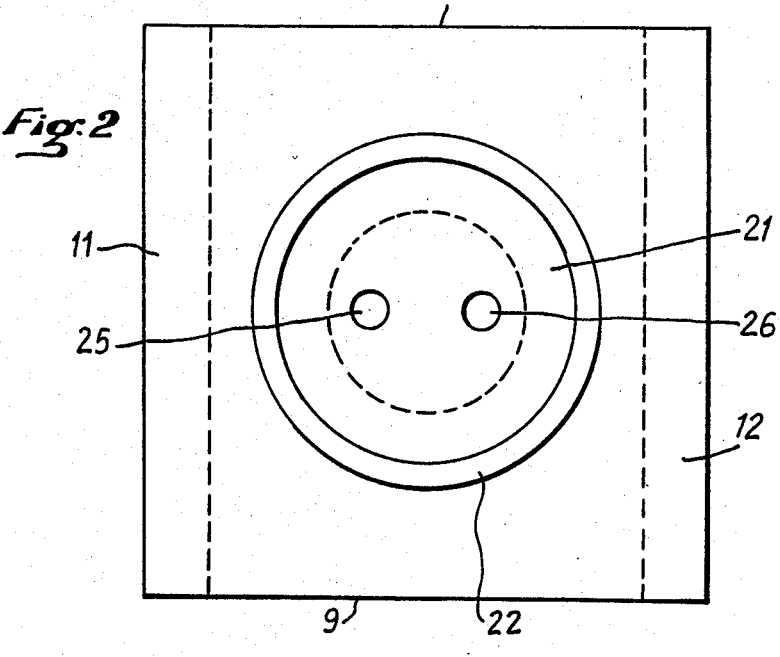

In the drawings:

FIG. 1 shows a view in section, through a vertical plane, of a cavity seal produced according to the present invention, and FIG. 2 shows a plan view of a specially shaped part constituting an essential part of the blocking device according to the invention.

The seal according to the invention is intended to block the mouth of a well 1 opening out in the ceiling of a cavity 2. A part 4 in the shape of a keystone is used. This part can be made of epoxy concrete (resin containing a silica filler, if appropriate with glass fibres or other fibres). It comprises a base 6 which can be arched and which is delimited by two parallel vertical faces 8, 9 and two inclined faces 11, 12. The inclined faces are intended to bear directly, or via a joint 14, for example made of epoxy concrete, or via a suitable wedge, against the corresponding inclined surfaces. These surfaces can be formed in the rock delimiting the cavity, if this rock is sufficiently hard, or can be the faces of concrete blocks 16, 17 supporting the arch of the cavity before the latter is cooled. In general, after the temperature has dropped to a sufficiently low value for the storage of liquefied gas, the rock or the mineral delimiting the cavity is frozen and is then sufficiently rigid not to be supported any longer, and the concrete blocks are of no further use. The faces 11 and 12 can be provided with reliefs 19 facilitating the adhesion of the concrete. However, these reliefs must not be too pronounced, so as not to hinder the penetration of the concrete to the bottom of the reliefs. These reliefs may or may not correspond to the reliefs in the opposite faces of the concrete blocks. The keystone thus occupies the position of a number of concrete blocks in both directions; this number depends on the dimensions of the voussoirs.

The central part of the top of the keystone preferably forms a circular plane surface 21. It is surrounded by a vertical skirt 22 forming a lip extending over a certain height, for a purpose which will be explained below. The lip delimits a shaft 23, the flat bottom 21 of which possesses a number of perforations 25, 26, depending on the number of pipes required to operate the reservoir. There can also be a manhole, which can be blocked after installation. Advantageously, these perforations open out, on the lower face, in a recess 28. Pipes 31, 32 are fitted in the perforations 25, 26 and open out in the recess 28, which thus provides a volume facilitating the connection of the pipes to internal tubes without moving the latter away from the ceiling of the cavity. Above the flat bottom, the pipes 31, 32 are protected with heat insulation 35, 36 and thus have greater diameters. The pipes 31, 32 can comprise, in the plane of the flat bottom 21, rigid discs which limit the insulation, these discs being fixed to the pipes. This arrangement thus determines a fixed point for the pipes 31, 32, the thermal expansion of which will take place upwards, through the insulation 35, 36, starting from the flat bottom 21.

The seal is made in the following way. The keystone is introduced and an epoxy concrete is then poured into the joints between the inclined faces 11, 12 and the opposite concrete blocks 16, 17. Suitable shuttering (not shown) is introduced inside in order to contain the concrete until it sets. This concrete 41 is poured up to a height near the edge of the lip 22. This height will be determined according to the characteristics of the terrain so as to have a firm and stable seat for the keystone. To make the pipes 31, 32 integral with the keystone, a layer 42 of pure epoxy concrete is poured into the bottom of the shaft 23. Permanent gaskets 43, placed around the pipes 31, 32, prevent the resin from escaping. The whole system is then bedded in an ordinary cement 44, after which the well can be filled with any suitable material having water impregnation characteristics similar to those of the surrounding natural rock. Depending on the particular case, it is possible to use sand or concretes having characteristics chosen so as to complement as well as possible the uniformity of the mechanical and petrophysical properties of the environment. After this, the cavity can be cooled by the known methods.

It is self-evident that the embodiment described is only an example and that it would be possible to modify it, in particular by the substitution of technical equivalents, without thereby exceeding the scope of the invention.

We claim:

1. In an underground cavity (2) storing liquefied fuel gases at temperatures below the ground freezing point, the mouth of a well (1) opening out in a ceiling of said underground cavity, said cavity having walls supportingly lined with reinforcing blocks (16, 17) terminating proximate but just short of said well mouth, said cavity walls being solidified during use by the freezing of ground water premeated therein, a device for blocking off said well mouth comprising: a keystone (4) having at least two lower, oppositely disposed, generally planar, downwardly converging side faces (11, 12) inclined to the vertical and supportingly bearing against corresponding upper faces of said reinforcing blocks, said keystone having at least one orifice (25, 26) in the region of a vertex thereof for the passage of pipes.

2. Device according to claim 1, wherein said at least one orifice is surrounded by a cylindrical, upwardly extending skirt (22).

3. Device according to one of claims 1 or 2, wherein an upper central zone of the keystone forms a flat bottom (21).

4. Device according to claims 1 or 2, wherein a central recess (28) is provided in a lower face of the device to facilitate the connection of pipes.

5. A device according to claim 2, wherein said skirt is inwardly spaced from said well to define an annular chamber therebetween for the reception of concrete.

* * * * *